(12) United States Patent
Soleymani

(10) Patent No.: US 6,493,358 B1
(45) Date of Patent: Dec. 10, 2002

(54) APPARATUS AND METHOD FOR DEMULTIPLEXING A FREQUENCY DIVISION MULTIPLEXED INPUT SIGNAL AND POLYPHASE DIGITAL FILTER NETWORK THEREFOR

(75) Inventor: Mohammad Reza Soleymani, Beaconsfield (CA)

(73) Assignee: EMS Technologies Canada, Limited, Ste-Anne-de-Bellevue (CA)

( * ) Notice: Subject to any disclaimer, the term of this patent is extended or adjusted under 35 U.S.C. 154(b) by 0 days.

(21) Appl. No.: 09/314,221

(22) Filed: May 19, 1999

(51) Int. Cl.[7] ................................................. H04J 1/00
(52) U.S. Cl. ........................ 370/480; 370/484; 375/350
(58) Field of Search ................................ 370/210, 203, 370/480, 481, 482, 484, 487, 488, 497, 204, 211, 319, 344, 532, 536, 208; 375/340, 350

(56) References Cited

U.S. PATENT DOCUMENTS

| | | | |
|---|---|---|---|
| 4,785,447 A | * 11/1988 | Ichiyoshi | ..................... 370/210 |
| 5,299,192 A | * 3/1994 | Guo et al. | ................... 370/210 |
| 5,587,939 A | 12/1996 | Soleymani | |
| 6,014,366 A | * 1/2000 | Ichiyoshi | ..................... 370/210 |
| 6,091,704 A | * 7/2000 | Butash | ........................ 370/210 |
| 6,317,409 B1 | * 11/2001 | Murakami | ................... 370/203 |

* cited by examiner

*Primary Examiner*—Ricky Ngo
*Assistant Examiner*—Phuc Tran
(74) *Attorney, Agent, or Firm*—Ogilvy Renault; James Anglehart (57) ABSTRACT

A filter network demultiplexes a frequency division multiplexed input signal which involves a reduced number of multiplier or multiplying steps. The filter network comprises $L-1$ $Z^{-N}$ shift registers in series receiving the multiplexed input signal $Y(n)$ to produce $L-1$ corresponding shifted signals, pairs of which are added. The filter network further comprises a set of q multiplier sections including p first multiplier sections each being coupled to the added signals for combining each output of a corresponding set of N transformed filter coefficients $g_i$. There are provided a set of N second adder sections each being coupled to distinct outputs of the multiplier sections for producing a corresponding set of N transformed signals, and a set of t third adders each receiving a distinct pair of signals $\{C_T(n), C_T(n)\}$ from the transformed signals $C_k(n)$ for producing a first filtered signal $A_o(n)$ and a set of $N-1$ filtered signals $A_k(n+k)$, with $k=1, \ldots, N-1$.

13 Claims, 8 Drawing Sheets

APPARATUS AND METHOD FOR DEMULTIPLEXING A FREQUENCY DIVISION MULTIPLEXED INPUT SIGNAL AND POLYPHASE DIGITAL FILTER NETWORK THEREFOR

BACKGROUND OF THE INVENTION

1. Field of the Invention

The invention relates to telecommunication field, and more particularly to apparatus and method for demultiplexing a frequency division multiplexed signal using a polyphase digital filter network.

2. Description of Prior Art

The use of satellites with multiple spot beam is a major step in increasing the capabilities of satellite communication. Multiple beam satellites have the advantage of having high gain and allowing the reuse of the same frequency band in geographically separated beams. The use of multiple spot beams requires additional switching on-board the satellite. This switching can be done either in the RF, IF or the baseband. Switching at the RF and IF necessitates the use of Time Division Multiple Access (TDMA) in the uplink which could lead to high rate modems in the earth stations, therefore increasing the cost of earth stations. On-board switching in the baseband requires down-conversion, demultiplexing and demodulation of the uplink data prior to switching and remultiplexing, remodulation and upconversion after switching to form the downlink. The part of the signal processing in the baseband is called On-board Baseband Processing (OBP). The use of the OBP results in a considerable flexibility in the choice of the access scheme and either TDMA or Frequency Division Multiple Access (FDMA) can be used. For the payloads with OBP, the use of FDMA is considered on the uplink to reduce ground station cost. On the other hand, Time Division Multiplexing (TDM) is used for its power efficiency on the downlink.

Moreover, use of FDMA on the uplink reduces the size of the earth terminal as compared to TDMA. However, the price paid is the increased complexity of the spacecraft payload. While a single demodulator is sufficient for demodulation of high bit rate TDMA on the uplink, several demodulators are required for the demodulation of the FDMA carriers received by the satellite. A solution to this problem is the use of a multi-carrier demodulator, referred to as a group demultiplexer/demodulator. Group demultiplexing is needed, for example, in the digital signal processing payloads if the uplink uses FDMA or some other type of spectrum sharing such as MF-TDMA or MF-CDMA. The more important and computational intensive section, referred to as the group demultiplexer, divides the incoming composite spectrum into separate channels. The second section, the demodulator, recovers the digital data for each individual channel.

There are several techniques for the group demultiplexer design. A straightforward method is per-channel filtering. In this method, a separate filter is used for each channel. This is only feasible for a small number of channels. For a large number of channel, sharp filters with many taps are required. Another method is the FFT/IFFT or frequency-domain filtering. In this method, a Fast Fourier Transform (FFT) is used to find the frequency spectrum of the composite FDM signal. Following the FFT, the frequency-domain coefficients are multiplied by coefficients of a filter in order to determine the frequency-domain samples falling into each of the carrier channels. For each set of frequency-domain coefficients, an Inverse FFT (IFFT) is used to recover the time-domain samples of the modulated carriers. This method is much less complex than the per-channel approach, while having a great degree of flexibility.

Figure 1:
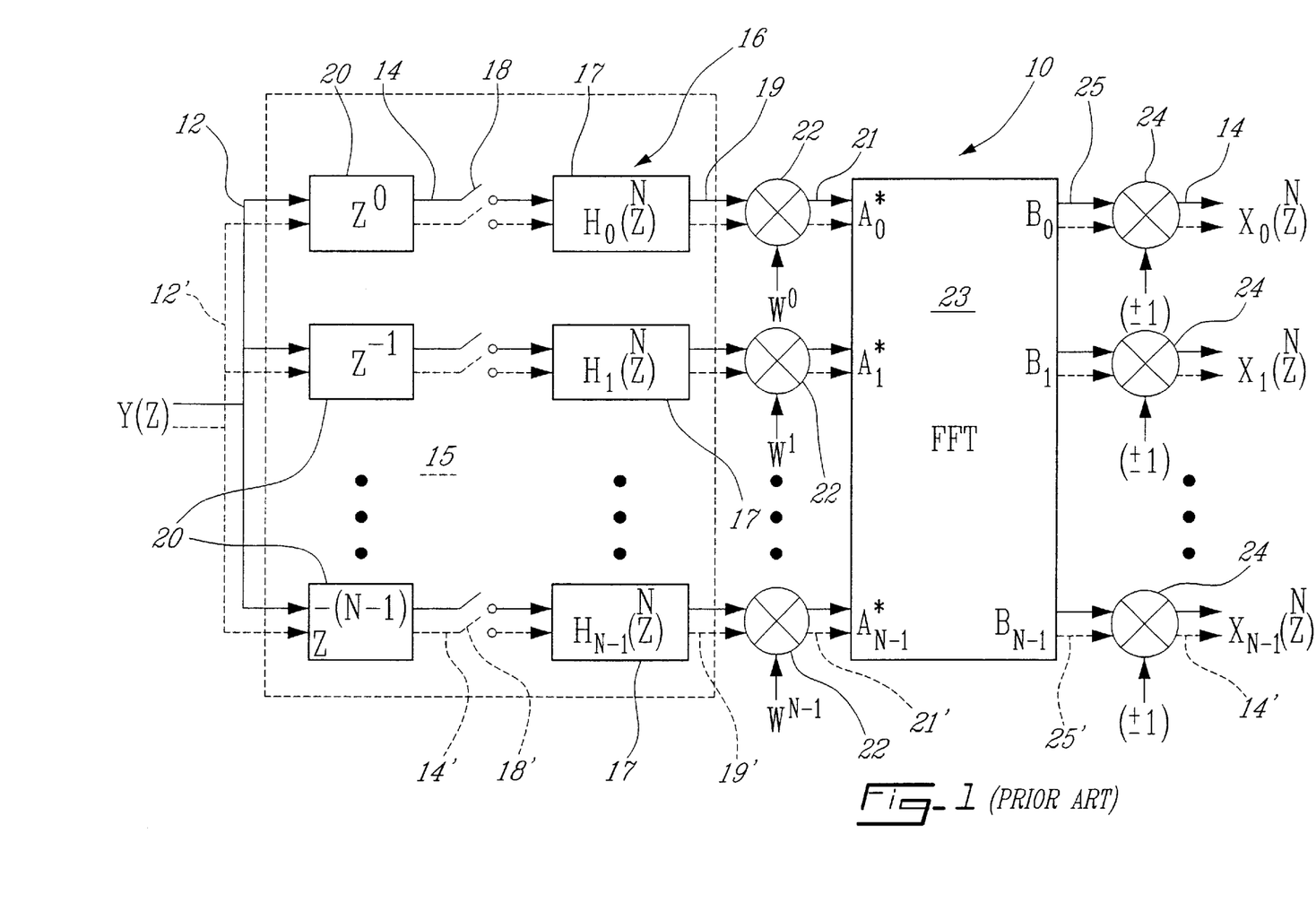
FIG. 1 is a block diagram of a polyphase/FFT group demultiplexer according to the prior art.

Another method for the implementation of the group demultiplexer is the polyphase/FFT method. In this method, a digital filter bank is implemented in cascade with an DFT processor, and preferably a FFT processor to provide better efficiency. This technique can be used when the bandwidths of the channels are equal and fixed. FIG. 1 is a block diagram of a polyphase/FFT group demultiplexer according to the prior art and generally designated at 10. Input Y(z) at 12, 12' and outputs $X_k(z^N)$ at 14, 14' with k=0, . . . , N–1, are in complex sampled form, as well known in the art, with solid lines 12, 14 representing the In-phase (or I) and dotted lines 14, 14' representing the Quadrature-phase (or Q) components of different signals. The notation used for the representation of the signals and delay elements is in the Z-domain. The elements specified by $Z^{-k}$ in FIG. 1 represent a delay of rT, normally implemented using shift registers of length r. That is, if the input to $Z^{-k}$ is a sample of a time signal u(t) at time kT, denoted by u[n], its output will be a sample of the signal u(t) at time nT–kT, denoted by u[n–k], where T is the time duration between two consecutive samples. The symbol Y(z) represents the Z-transform of a composite signal y[n] consisting of N frequency multiplexed signals represented as follows:

$$Y(z) = \sum_{n=-\infty}^{+\infty} y[n] z^{-n} \quad (1)$$

The outputs $X_i(z^N)$, i=0,1, . . . , N–1 represent the N individual signals after demultiplexing. The Z-transform being represented as a function of $Z^N$ rather than z represents a decimation of the outputs by N, i.e., only every Nth sample of $x_i[n]$ is retained. This is consistent with the Nyquist sampling theorem, relating the number of samples required for discrete representation of a signal to its bandwidth. That is, since the bandwidth of each of the N individual channels is 1/Nth of the total bandwidth occupied by the composite signal y(t), to represent each of these individual signals, we need only to have 1/Nth of the samples required for perfect reconstruction of y(t).

The digital filter network 15 comprises a filter bank 16 shown in FIG. 1 consisting of sub-filters $H_i(z^N)$, i=0,1, . . . , N–1, designated at 17, which is derived from a single prototype Finite Impulse Response (FIR) filter, H(z), through a decimation by N. That is, each sub-filter $H_i(Z^N)$ consists of 1/Nth of the coefficients of H(z). Denoting the coefficients of the prototype filter by $h_i$, i=0,1, . . . , NL–1, the coefficients of the sub-filter, $H_0(z^N)$, are $h_0, h_N, h_{2N}, \ldots, h_{N(L-1)}$), and the coefficients of the sub-filter, $H_1(z^N)$, are $h_1, h_{N+1}, h_{2N+1}, \ldots, h_{N(L-1)+1}$. In general, the coefficients of the ith sub-filter, $H_i(z^N)$, are $h_i, h_{N+i}, h_{2N+i}, \ldots, h_{N(L-1)+i}$. The derivation of the sub-filters from the prototype filter is based on the following factorization:

$$H(z) = \sum_{n=0}^{NL-1} h_n z^{-n} = \sum_{i=0}^{N-1} z^{-i} \sum_{k=0}^{L-1} h_{kN+i} z^{-kN} = \sum_{i=0}^{N-1} z^{-i} H_i(z^N). \quad (2)$$

The switches 18, 18' at the input of the sub-filters 17 close every N samples connecting the outputs of the shift registers 20 to different sub-filters. That is, each sub-filter operates at a rate which is 1/Nth that of the sample rate of the input signal, y[n]. Multiplication of output signals $A_i(n)$ by $w^i$, i=0,1, ..., N−1 generated at outputs 19, 19', where $w=e^{-i\pi/N}$ is performed by a set of N multipliers 22 and results in a phase shift of $i\pi/N$ to produce filtered output signals $A^*_i(n)$ at outputs 21, 21', from which the FFT processor 23 finds the Discrete Fourier Transform (DFT) as defined by:

$$B_k = \sum_{i=0}^{N-1} A_i e^{j\frac{2\pi}{N}ik} \qquad (3)$$

Finally, the alternate samples of each of the N outputs 25, 25' of the FFT processor are inverted by the multipliers 24 to produce demultiplexed output signals $X_k(Z^N)$ at outputs 14, 14'.

From the foregoing, it can be seen that the number of multipliers required for the implementation of the polyphase filter network is NL, which correspond to coefficients $h_0, h_1, h_2, \ldots, h_{NL-1}$ of the prototype filter. Such a number of multipliers may represents a limiting factor in the context of payload optimization especially where a high number of channels is to be handled by a satellite On-board demultiplexer.

SUMMARY OF THE INVENTION

It is therefore an object of the present invention to provide apparatus and method for demultiplexing a frequency division multiplexed input signal which involves a reduced number of multipliers or multiplying steps.

According to the above object, from a broad aspect of the present invention, there is provided a polyphase digital filter network based on a linear phase prototype filter for use in a group demultiplexer for generating N output data signals associated with N channels from a corresponding Frequency Division Multiplexed input signal Y(n), said linear phase prototype filter comprising N sub-filters being characterized by L coefficients forming NL coefficients for said prototype filter. The polyphase digital filter network comprises L−1 $Z^{-N}$ shift registers in series receiving the multiplexed input signal Y(n) to produce L−1 corresponding shifted signals Y(n−rN), with r=1, ..., L−1, and a set of p first adder sections each receiving a distinct pair of signals from the multiplexed input signal Y(n) and the shifted signals Y(n−rN). The filter network further comprises a set of q multiplier sections including p first multiplier sections each being coupled to a respective output of a corresponding one of the first adder sections for combining each said output with a corresponding set of N transformed filter coefficients $g_i$ derived from the coefficients of the linear phase prototype filter, the set of q multiplier sections including a further multiplier section receiving shifted signal $$Y\left(n - \left(\frac{L-1}{2}\right)N\right)$$

where L is odd for combining thereof in parallel with a corresponding set of s further transformed filter coefficients $g_i$ derived from the coefficients of the linear phase prototype filter. The filter network further comprises a set of N second adder sections each being coupled to distinct outputs of the multiplier sections for producing a corresponding set of N transformed signals $C_k(n)$, with k=0, ..., N−1; and a set of t third adders each receiving a distinct pair of signals $\{C_T(n),C_T(n)\}$ from the transformed signals $C_k(n)$ for producing a first filtered signal $A_0(n)$ and a set of N−1 filtered signals $A_k(n+k)$, with k=1, ..., N−1.

According to a further broad aspect of the present invention, there is provided a polyphase/DFT digital group demultiplexer for generating N output data signals associated with N channels from a corresponding Frequency Division Multiplexed input signal Y(n), comprising a polyphase digital filter network based on a linear phase prototype filter formed by N sub-filters being characterized by L coefficients forming NL coefficients for said prototype filter. The polyphase digital filter network comprises L−1 $Z^{-N}$ shift registers in series receiving the multiplexed input signal Y(n) to produce L−1 corresponding shifted signals Y(n−rN), with r=1, ..., L−1; and a set of p first adder sections each receiving a distinct pair of signals from the multiplexed input signal Y(n) and the shifted signals Y(n−rN). The filter network further comprises a set of q multiplier sections including p first multiplier sections each being coupled to a respective output of a corresponding one of the first adder sections for combining each said output with a corresponding set of N transformed filter coefficients $g_i$ derived from the coefficients of the linear phase prototype filter, the set of q multiplier sections including a further multiplier section receiving shifted signal $$Y\left(n - \left(\frac{L-1}{2}\right)N\right)$$

where L is odd for combining thereof with a corresponding set of s further transformed filter coefficients $g_i$ derived from the coefficients of said linear phase prototype filter. The filter network further comprises a set of N second adder sections each being coupled to selected outputs of the multiplier sections for producing a corresponding set of N transformed signals $C_k$, with k=0, ..., N−1; and a set of t third adders each receiving a distinct pair of signals $\{C_T(n),C_T(n)\}$ from the transformed signals $C_k(n)$ for producing a first filtered signal $A_0(n)$ and a set of N−1 filtered signals $A_k(n+k)$, with k=1, ..., N−1. The filter network further comprises a set of N−1 shift registers $Z^{-k}$ receiving said filtered signals $A_k(n+k)$ to produce N−1 corresponding filtered signals $A_k(n)$, with k=1, ..., N−1. The group demultiplexer further comprises a set of N phase offset multipliers receiving the filtered signals $A_0(n)$ and $A_k(n)$ forming a set of filtered signals $A_k(n)$, with k=0, ..., N−1, for combining thereof with a corresponding set of N phase offset parameter $w_k$, with k=0, ..., N−1, to produce a corresponding set of phase offset filtered signals $A^*_k(n)$; Discrete Fourier Transform processor means for generating a set of N processed output signals $B_k(n)$ from said corresponding set of phase offset filtered signals $A^*_k(n)$, with k=0, ..., N−1; and a set of N output alternate inverting multipliers each receiving a corresponding one of the set of processed output signals $B_k(n)$ to generate the N output data signals associated with the N channels.

According to a still further broad aspect of the present invention, there is provided a method of demultiplexing a Frequency Division Multiplexed input signal Y(n) for generating N output data signals associated with N channels, the method comprising the steps of: i) generating L−1 shifted signals Y(n−rN), with r=1, (l−1)N, from the multiplexed input signal Y(n); ii) coupling p pairs of distinct signals from the multiplexed input signal Y(n) and the shifted signals Y(n−rN) to produce p corresponding pairs of coupled output signals; iii) combining each said pair of output signals with a corresponding set of N transformed filter coefficients derived from coefficients of a linear phase prototype filter; iv) combining shifted signal $$Y\left(n-\left(\frac{L-1}{2}\right)N\right)$$

with a corresponding set of s further transformed filter coefficients derived from the coefficients of the linear phase prototype filter, whenever L is odd; v) coupling the results of the combining steps to produce N transformed signals $C_k$, with k=0, ..., N−1; vi) coupling distinct pair of signals $\{C_T(n),C_T(n)\}$ from the transformed signals $C_k(n)$ for producing a first filtered signal $A_0(n)$ and a set of N−1 filtered signals $A_k(n+k)$, with k=1, ..., N−1; vii) shifting the filtered signals $A_k(n+k)$ to produce N−1 corresponding filtered signals $A_k(n)$, with k=1, ..., N−1; viii) phase offsetting the filtered signals $A_0(n)$ and $A_k(n)$ forming a set of filtered signals $A_k(n)$, to produce a corresponding set of phase offset filtered signals $A^*_k(n)$; ix) applying a Discrete Fourier Transform on the phase offset filtered signals $A^*_k(n)$ to generate a set of N output signals $B_k(n)$, with k=0, ..., N−1; and x) alternately inverting the output signals $B_k(n)$ to generate the N output data signals associated with the N channels.

DETAILED DESCRIPTION OF THE PREFERRED EMBODIMENT

The present invention takes advantage of the symmetry found in linear phase prototype filter in order to reduce the number of the required multipliers or multiplying steps up to one half of that normally used. While taking advantage of the symmetry may be straightforward for the implementation of a single filter, as it can be seen for each sub-filter of the prototype filter forming the digital filter network 30 shown in FIG. 2, which prototype filter is characterized by symmetric coefficients, i.e., $h_0=h_{NL-1}$, $h_1=h_{NL-2}$ or, in general, $h_i=h_{NL-1-i}$, i=0, ..., NL−1, with N=4 and L=6 (NL=24) in the example shown, that it is not the case for a polyphase filter network, since symmetrically located multipliers operate on different samples of the input. In the case of a single output filter, one simply needs to add the input samples to be multiplied by the same coefficients before multiplication and, therefore, performs one multiplication instead of two. In the case of polyphase filter bank, since the multipliers with similar coefficients do not contribute to the same output, the simple technique of adding symmetrically opposed samples does not work. It is pointed out that the shift registers 31 in the filter branches are shown as function of Z instead of z in order to emphasize the fact that these shift registers are clocked at one fourth the input sample rate. As a result, each single shift through these delay elements is equivalent to a delay of 4T, T being the period associated with the sampling rate.

Figure 3:
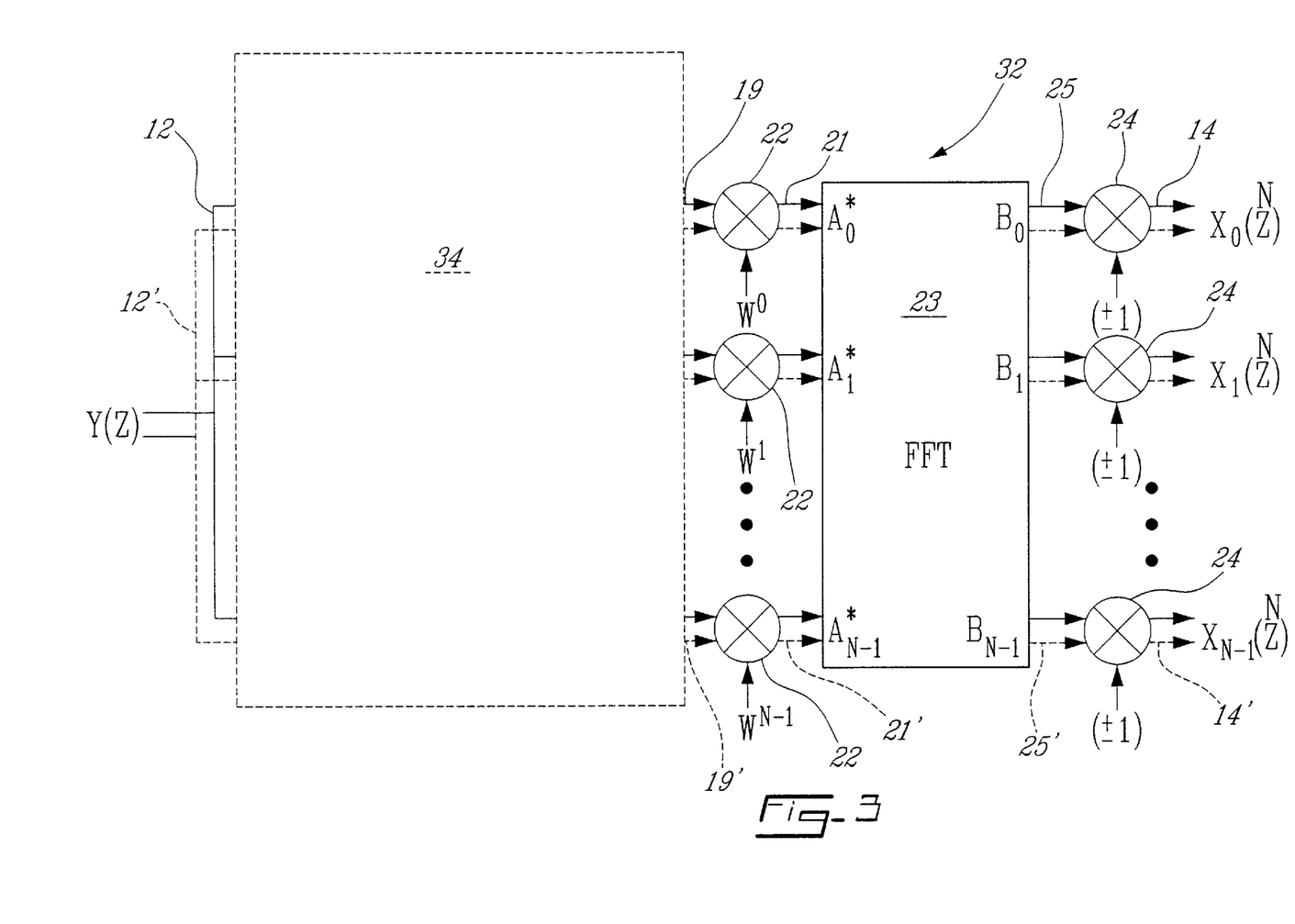
FIG. 3 is a general block diagram of a polyphase/FFT group demultiplexer according to a preferred embodiment of the present invention.

Referring now to FIG. 3, there is shown a polyphase/FFT group demultiplexer according to a preferred embodiment of the present invention and generally designated at 32, which comprises a polyphase filter network 34 being based on a linear phase prototype filter and receiving a Frequency Division Multiplexed input signal Y(Z) in complex sampled form at 12, 12'. The demultiplexer 32 further comprises a first set of N multipliers 22 for applying a phase shift of $i\pi/N$ to the filtered output signals $A_i(n)$ as generated at outputs 19, 19' of the filter network 34, followed by a FFT processor 23 for applying a Discrete Fourier Transform (DFT) to the filtered output signals $A_i(n)$ as obtained at outputs 21, 21' of multipliers 22. Finally, a second set N multipliers 24 are provided for inverting alternate samples of each of the N output signals of the FFT processor 23 as generated at outputs 25, 25' to produce demultiplexed output signals $X_k(Z^N)$ at outputs 14, 14' in complex sampled form. It should be pointed out that apart from the filter network 34, a same system architecture as found in the prior art is employed in the design of the demultiplexer shown in FIG. 3, generating same output signals $A_i(n)$, $A_i(n)$ and $X_k(Z^N)$, but with higher efficiency due to a reduced number of multipliers as part of the filter network 34, as will be later explained in more detail. In the following FIGS. 4 to 8, all signals are in complex form having an In-phase (I) and a Quadrature-phase (Q) component, as explained before. However, for the sake of clarity, single lines instead of pairs of solid and dotted lines are illustrated.

Figure 2:
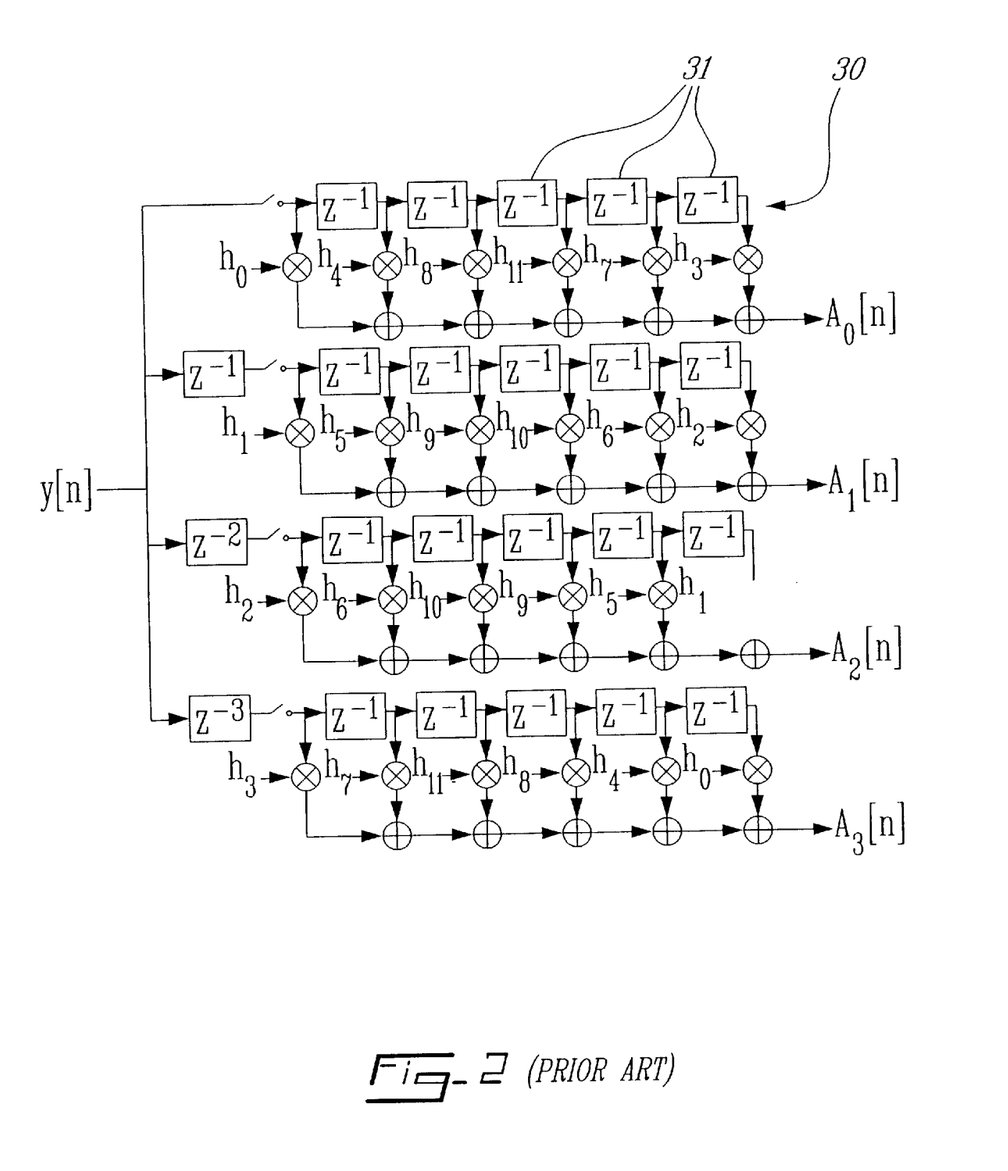
FIG. 2 is a block diagram of a typical digital filter network based on a linear phase prototype filter according to the prior art.
Figure 4:
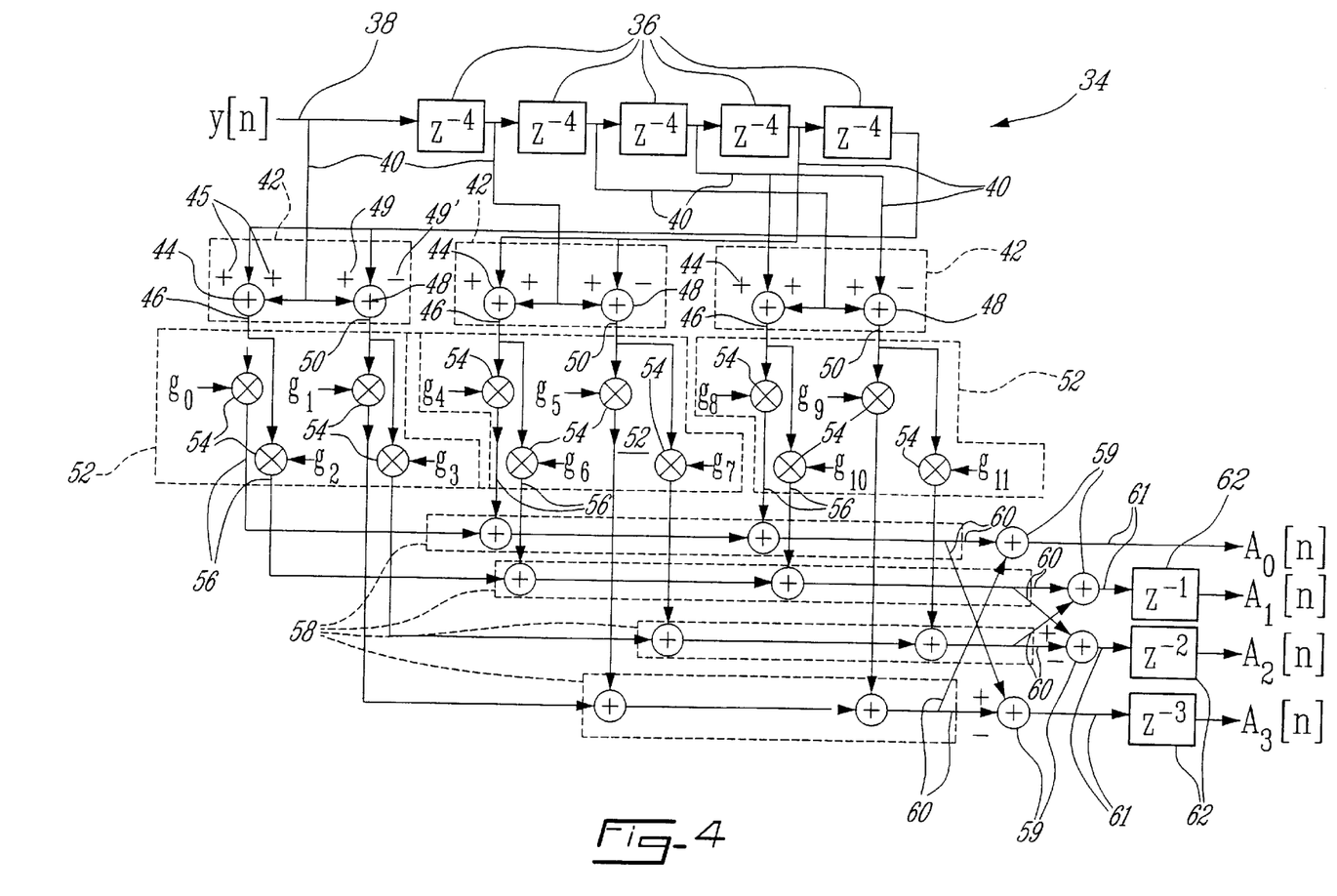
FIG. 4 is a block diagram of a first example of a digital polyphase network according to the preferred embodiment of the present invention, where the number N of channels and the number L of coefficients per sub-filter are both even.
Figure 7:
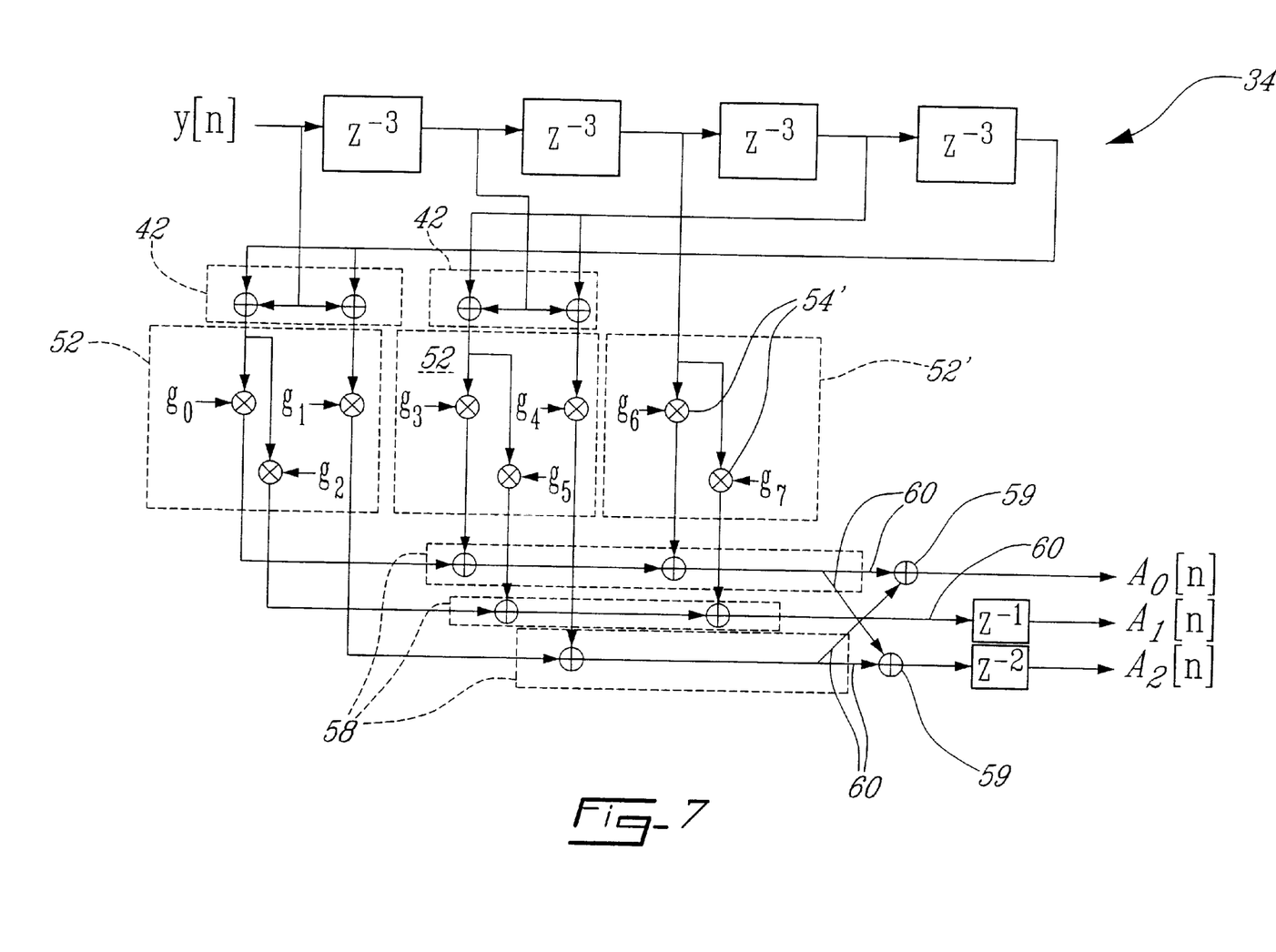
FIG. 7 is a block diagram of a third example of a digital polyphase network according to the preferred embodiment of the present invention, where the number N of channels and the number L of coefficients per sub-filter are both odd.
Figure 8:
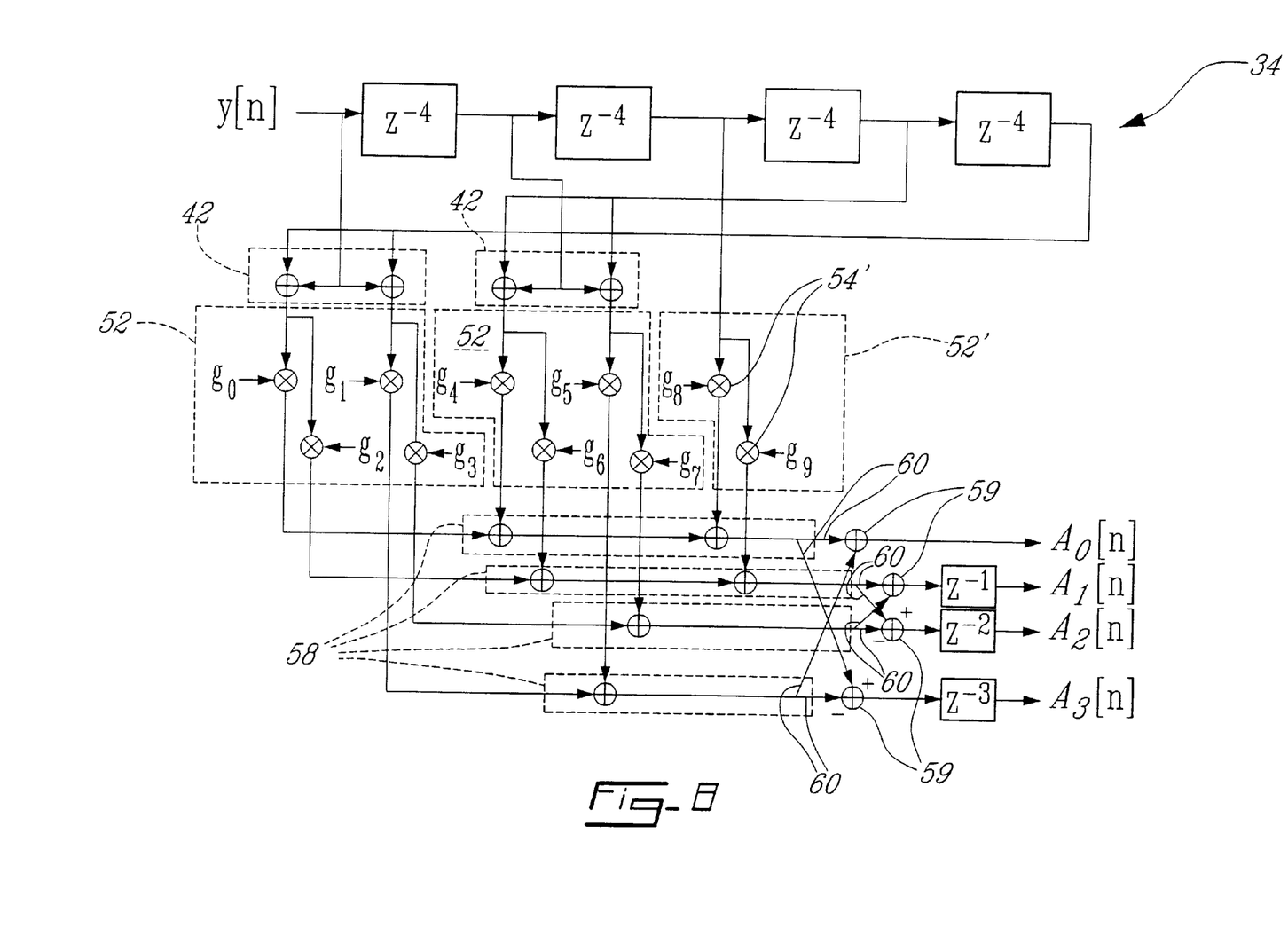
FIG. 8 is block diagram of a fourth example of a digital polyphase network according to the preferred embodiment of the present invention, where the number N of channels is even and the number L of coefficients per sub-filter is odd.

Referring to FIG. 4, a polyphase digital filter network for use as part of a group demultiplexer as generally described above and in accordance to the present invention will be now described for a first particular example wherein N and L are both even, using a four (N=4) channel polyphase digital network 34 based on a prototype filter such as shown in FIG. 2 (L=6). However, since the present invention is applicable whenever N or L are chosen to be either even or odd integers, the following mathematical expressions cover all possible combinations of integer: values for N and L, as it will be later explained in more detail with reference to FIGS. 6 to 8. As shown in FIG. 4, the filter network 34 comprises L−1 $Z^{-N}$ shift registers 36 in series receiving the multiplexed input signal Y(n) via an input line 38, to produce L−1 corresponding shifted signals Y(n−rN), with r=1, ..., L−1 through output lines 40 forming filter branches. The filter network 34 further comprises a set of p first adder sections 42 as delimited with dotted lines in FIG. 4, each receiving through corresponding ones of lines 40 a distinct pair of signals $\{Y(n-mN),Y(n-(L-(1+m)N))\}$ from the multiplexed input signal Y(n) and the shifted signals Y(n−rN), wherein:

$$p = \begin{cases} \dfrac{L}{2} & \text{where } L \text{ is even} \\ \dfrac{L-1}{2} & \text{where } L \text{ is odd} \end{cases} ; \text{ and} \quad (4)$$

$$m = \begin{cases} 0, \ldots, \dfrac{L-2}{2} & \text{where } L \text{ is even} \\ 0, \ldots, \dfrac{L-3}{2} & \text{where } L \text{ is odd} \end{cases} ; \quad (5)$$

and therefore p=3 and m=2 in the present example. Each first adder section 42 includes a first adder 44 having a pair of positive inputs 45 receiving the distinct pair of signals {Y(n−mN),Y(n−(L−(1+m)N))} and an output line 46, and a second adder 48 having positive and inverting inputs 49, 49' receiving also the signals {Y(n−mN),Y(n−(L−(1+m)N))} respectively, and an output line 50. Each pair of first and second adder output lines 46 and 50 form a respective output for the corresponding first adder section 42. The filter network 34 further comprises a set of q multiplier sections including p first multiplier sections 52 as delimited with dotted lines in FIG. 4, each being coupled to a respective output of a corresponding one of the first adder sections 42 for combining each output with a corresponding set of N transformed filter coefficients $g_i$ derived from the coefficients of the linear phase prototype filter, wherein:

$$q = \begin{cases} p & \text{where } L \text{ is even} \\ p+1 & \text{where } L \text{ is odd} \end{cases} ; \quad (6)$$

and therefore q=p=4 in the present example. The method of obtaining values for $g_i$ will be explained later in more detail. As will be described later with reference to FIGS. 7 and 8 where L is odd, in that case the set of q multiplier sections includes a further multiplier section receiving shifted signal $$Y\left(n - \left(\dfrac{L-1}{2}\right)N\right)$$

for combining thereof in parallel with a corresponding set of s further transformed filter coefficients $g_i$ derived from the coefficients of the linear phase prototype filter, wherein:

$$s = \begin{cases} \dfrac{N}{2} & \text{where } N \text{ is even} \\ \dfrac{N+1}{2} & \text{where } N \text{ is odd} \end{cases} \quad (7)$$

therefore s=0 in the present example since L is even. Each first multiplier section 42 comprises N multipliers 54 each having a respective output $M_i$ 56 and being coupled in parallel to the corresponding first adder output for combining thereof with N corresponding transformed filter coefficients $g_i$, and s multipliers each having an output $M_i$ and being coupled in parallel to the corresponding second adder section output for combining thereof with the corresponding further transformed filter coefficients $g_i$. The filter network 34 is further provided with a set of N second adder sections 58 as delimited with dotted lines in FIG. 4, each being coupled to distinct outputs 56 of the multiplier sections 52 for producing a corresponding set of N transformed signals $C_k(n)$ with k=0, ..., N−1, through output lines 60, according to the following equation:

$$C_k(n) = \sum_{i=k+Nl} M_i; \text{ with } \begin{cases} l = 0, \ldots, \dfrac{L}{2} - 1 & \text{where } L \text{ is even} \\ l = 0, \ldots, \dfrac{L-1}{2} & \text{where } L \text{ is odd and } k \text{ is even} \\ l = 0, \ldots, \dfrac{L-3}{2} & \text{where } L \text{ is odd and } k \text{ is odd.} \end{cases} \quad (8)$$

There is further provided a set of t third adders 59 each receiving a distinct pair of signals {$C_T(n), C_{T'}(n)$} from the transformed signals $C_k(n)$ for producing through output lines 61, a first filtered signal $A_0(n)$ and a set of N−1 filtered signals $A_k(n+k)$, with k=1, ..., N−1, wherein:

$$\{C_T(n), C_{T'}(n)\} = \quad (9)$$

$$\{C_{2u}(n), C_{2u+1}(n)\} \begin{cases} \text{for } u = 0, \ldots, \dfrac{N}{2} - 1 & \text{where } N \text{ is even} \\ \text{for } u = 0, \ldots, \dfrac{N-3}{2} & \text{where } N \text{ is odd;} \end{cases}$$

$$\{C_T(n), C_{T'}(n)\} = \{C_{2(n-u-1)}(n), -C_{2(n-u)-1}(n)\} \quad (10)$$

$$\begin{cases} \text{for } u = \dfrac{N}{2}, \ldots, N-1 & \text{where } N \text{ is even} \\ \text{for } u = \dfrac{N+1}{2}, \ldots, N-1 & \text{where } N \text{ is odd;} \end{cases}$$

$$t = \begin{cases} N & \text{where } N \text{ is even} \\ N-1 & \text{where } N \text{ is odd; and} \end{cases} \quad (11)$$

$$A_{u=\frac{N-1}{2}}\left(n + \dfrac{N-1}{2}\right) = C_{N-1}(n) \text{ where } N \text{ is odd.} \quad (12)$$

According to a parallel output implementation used in the present first example, the filter network further comprises N−1 $Z^{-k}$ shift registers 62 receiving the filtered signals $A_k(n+k)$ to produce N−1 corresponding filtered signals $A_k(n)$, with k=1, ..., N−1, which are fed to the multipliers 22 as explained before with reference to FIG. 3. Thus, this implementation generates four parallel output samples every four clock cycles. That is, for each four sample of y[n], there is one set of four output samples available every fourth outputs by T, 2T, 3T, respectively, so that all four output samples are available simultaneously every four clock cycles.

Figure 5:
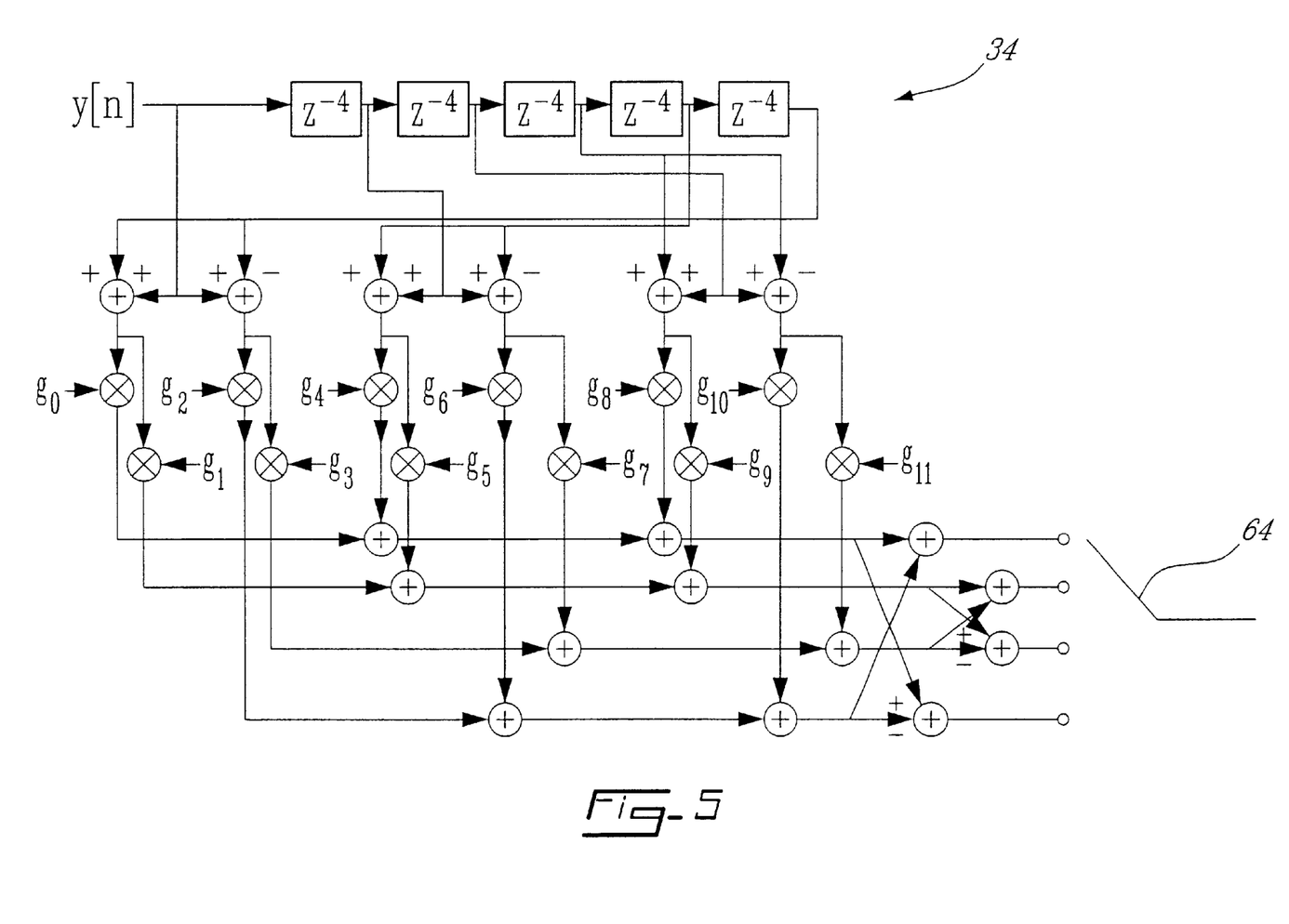
FIG. 5 is a block diagram of a variant of the example shown in FIG. 4, which provides a time-multiplexed output.

Referring now to FIG. 5, a block diagram of a variant of the polyphase digital filter network according to the first example shown in FIG. 4 is shown, which provides a time-multiplexed output. That implementation only differs from the parallel output implementation in that it is adapted to work with a commutation device 64 and in that no output shift registers are provided, for directly generating $A_k(n)$, with k=1, ..., N−1, serially in a time multiplexed format. Comparing the prior art filter network shown in FIG. 2 with the filter network of the example shown in FIG. 4, it is interesting to note that the reduction in the number of multipliers, estimated as $$\dfrac{NL}{2}$$

where L is even, is not achieved at the expense of an increase in the number of shift registers or adders. In fact, the number of adders is even reduced, while the number of shift registers remain unchanged. As to the variant shown in FIG. 5, the number of shift registers has been further reduced by N−1.

The basic scheme inherent to a polyphase digital filter network for use as part of a group demultiplexer as generally described above and in accordance to the present invention will be now developed for the first example shown in FIG. 4, using the relations set out above. The expressions for $A_0[n]$, $A_1[n]$, $A_2[n]$ and $A_3[n]$ can be expressed as follows:

$$A_0[n]=h_0y[n]+h_4y[n-4]+h_8y[n-8]+h_{11}y[n-12]+h_7y[n-16]+h_3y[n-20] \quad (13.1)$$

$$A_1[n]=h_1y[n-1]+h_5y[n-5]+h_9y[n-9]+h_{10}y[n-13]+h_6y[n-17]+h_2y[n-21] \quad (13.2)$$

$$A_2[n]=h_2y[n-2]+h_6y[n-6]+h_{10}y[n-10]+h_9y[n-14]+h_5y[n-18]+h_1y[n-22] \quad (13.3)$$

$$A_3[n]=h_3y[n-3]+h_7y[n-7]+h_{11}y[n-11]+h_8y[n-15]+h_4y[n-19]+h_0y[n-23] \quad (13.4)$$

Substituting n+1, n+2 and n+3 in (13.1), (13.2) and (13.3), gives:

$$A_0[n]=h_0y[n]+h_4y[n-4]+h_8y[n-8]+h_{11}y[n-12]+h_7y[n-16]+h_3y[n-20] \quad (14.1)$$

$$A_1[n+1]=h_1y[n]+h_5y[n-4]+h_9y[n-8]+h_{10}y[n-12]+h_6y[n-16]+h_2y[n-20] \quad (14.2)$$

$$A_2[n+2]=h_2y[n]+h_6y[n-4]+h_{10}y[n-8]+h_9y[n-12]+h_5y[n-16]+h_1y[n-20] \quad (14.3)$$

$$A_3[n+3]=h_3y[n]+h_7y[n-4]+h_{11}y[n-8]+h_8y[n-12]+h_4y[n-16]+h_0y[n-20] \quad (14.4)$$

Let's define the auxiliary variables $C_0[n]$, $C_1[n]$, $C_2[n]$ and $C_3[n]$ as follows:

$$C_0[n] = \frac{A_0[n] + A_3[n+3]}{2}; \quad (15.1)$$

$$C_1[n] = \frac{A_0[n] - A_3[n+3]}{2}; \quad (15.2)$$

$$C_2[n] = \frac{A_1[n+1] + A_2[n+2]}{2}; \quad (15.3)$$

$$C_3[n] = \frac{A_1[n+1] - A_2[n+2]}{2}; \quad (15.4)$$

Substituting for $A_0[n]$, $A_1[n+1]$, $A_2[n+2]$ and $A_3[n+3]$ from equations (14.1) to (14.4) and using coefficients $g_i$, i=0, . . . , 11 given in Table 1, gives:

TABLE 1

| | |
|---|---|
| $g_0$ | $(h_0 + h_3)/2$ |
| $g_1$ | $(h_0 + h_3)/2$ |
| $g_2$ | $(h_1 + h_2)/2$ |
| $g_3$ | $(h_1 - h_2)/2$ |
| $g_4$ | $(h_4 + h_7)/2$ |
| $g_5$ | $(h_4 - h_7)/2$ |
| $g_6$ | $(h_5 + h_6)/2$ |
| $g_7$ | $(h_5 - h_6)/2$ |
| $g_8$ | $(h_8 + h_{11})/2$ |
| $g_9$ | $(h_8 - h_{11})/2$ |
| $g_{10}$ | $(h_9 + h_{10})/2$ |
| $g_{11}$ | $(h_9 - h_{10})/2$ |

$$C_0[n]=g_0\{y[n]+y[n-20]\}+g_4\{y[n-4]+y[n-16]\}+g_8\{y[n-8]+y[n-12]\} \quad (16.1)$$

$$C_1[n]=g_1\{y[n]-y[n-20]\}+g_5\{y[n-4]-y[n-16]\}+g_9\{y[n-8]-y[n-12]\} \quad (16.2)$$

$$C_2[n]=g_2\{y[n]+y[n-20]\}+g_6\{y[n-4]+y[n-16]\}+g_{10}\{y[n-8]+y[n-12]\} \quad (16.3)$$

$$C_3[n]=g_3\{y[n]-y[n-20]\}+g_7\{y[n-4]-y[n-16]\}+g_{11}\{y[n-8]-y[n-12]\} \quad (16.4)$$

Comparing equations and (14) and (16), it is observed that while computation of $A_i[n]$, i=0, 1, 2, 3 requires 24 multiplying steps, computation of $C_i[n]$, i=1, 2, 3 needs only $$\frac{NL}{2} = 12$$

multiplying steps. Therefore, it is more efficient to compute $C_i[n]$'s first and then calculate $A_0[n]$, $A_1[n+1]$, $A_2[n+2]$, $A_3[n+3]$ using the following equations and, finally, find $A_i[n]$'s by shifting these delayed outputs:

$$A_0[n]=C_0[n]+C_1[n]; \quad (17.1)$$

$$A_1[n+1]=C_2[n]+C_3[n]; \quad (17.2)$$

$$A_2[n+2]=C_2[n]-C_3[n]; \quad (17.3)$$

$$A_3[n+3]=C_0[n]-C_1[n]; \quad (17.4)$$

Now, the derivation for the general case of any even integer values for N and L will be presented. Denoting the outputs of the filter network by $A_0[n]$, $A_1[n]$, . . . , $A_{N-1}[n]$, we have:

$$A_0[n]=h_0y[n]+h_Ny[n-N]+ \ldots +h_{(L-1)N}y[n-(L-1)N] \quad (18.1)$$

$$A_1[n]=h_1y[n-1]+h_{N+1}y[n-(N+1)]+ \ldots + h_{(L-1)N+1}y[n-(L-1)N-1] \quad (18.2)$$

$$A_2[n]=h_2y[n-2]+h_{N+2}y[n-(N+2)]+ \ldots + h_{(L-1)N+2}y[n-(L-1)N-2] \quad (18.3)$$

$$A_{N-1}[n]=h_{N-1}y[n-(N-1)]+h_{2N-1}y[n-(2N-1)]+ \ldots + h_{LN-1}y[n-(LN-1)] \quad (18.N)$$

Taking advantage of the symmetry of the coefficients of the linear phase filter, i.e., $h_k=h_{(NL-1)-k}$ for k=0, . . . , LN−1 gives:

$$A_0[n]=h_0y[n]+h_Ny[n-N]+ \ldots +h_{N-1}y[n-(L-1)N] \quad (19.1)$$

$$A_1[n]=h_1y[n-1]+h_{N+1}y[n-(N+1)]+ \ldots +h_{N-2}y[n-(L-1)N-1] \quad (19.2)$$

$$A_2[n]=h_2y[n-2]+h_{N+2}y[n-(N+2)]+ \ldots +h_{N-3}y[n-(L-1)N-2] \quad (19.3)$$

$$A_{N-1}[n]=h_{N-1}y[n-(N-1)]+h_{2N-1}y[n-(2N-1)]+ \ldots + h_0y[n-(LN-1)] \quad (19.4)$$

Substituting n+1, n+2, . . . , n+(N−1) for n in the 1st., 2nd., . . . , Nth. equation, gives the following equations:

$$A_0[n]=h_0y[n]+h_Ny[n-N]+ \ldots +h_{N-1}y[n-(L-1)N] \quad (20.1)$$

$$A_1[n+1]=h_1y[n]+h_{N+1}y[n-N]+ \ldots +h_{N-2}y[n-(L-1)N] \quad (20.2)$$

$$A_2[n+2]=h_2y[n]+h_{N+2}y[n-N]+ \ldots +h_{N-3}y[n-(L-1)N] \quad (20.3)$$

$$A_{N-1}[n+N-1]=h_{N-1}y[n]+h_{2N-1}y[n-N]+ \ldots +h_0y[n-(L-1)N] \quad (20.N)$$

These equations are the generalization of the equations (14.1) to (14.4). Then, let's define the following auxiliary variables as follows:

$$C_0[n] = \frac{A_0[n] + A_{N-1}[n+N-1]}{2} \quad (21.1)$$

$$C_1[n] = \frac{A_0[n] - A_{N-1}[n+N-1]}{2} \quad (21.2)$$

$$C_2[n] = \frac{A_1[n+1] + A_{N-2}[n+N-2]}{2} \quad (21.3)$$

-continued $$C_3[n] = \frac{A_1[n+1] - A_{N-2}[n+N-2]}{2} \quad (21.4)$$

$$\vdots$$

$$C_{N-2}[n] = \frac{A_{\frac{N}{2}-1}\left[n+\frac{N}{2}-1\right] + A_{\frac{N}{2}}\left[n+\frac{N}{2}\right]}{2} \quad (21.N-1)$$

$$C_{N-1}[n] = \frac{A_{\frac{N}{2}-1}\left[n+\frac{N}{2}-1\right] - A_{\frac{N}{2}}\left[n+\frac{N}{2}\right]}{2} \quad (21.N)$$

These equation are the generalization of the equations (15.1) to (15.4). Thus, the auxiliary variables can be expressed as follows:

$$C_0[n]=g_0\{y[n]+y[n-(L-1)N]\}+g_N\{y[n-N]+y[n-(L-2)N]\}+\ldots+g_{(L/2-1)N}\{y[n-(L/2-1)N]+y[n-L/2N]\} \quad (22.1)$$

$$C_1[n]=g_1\{y[n]-y[n-(L-1)N]\}+g_{N+1}\{y[n-N]-y[n-(L-2)N]\}+\ldots+g_{(L/2-1)N+1}\{y[n-(L/2-1)N]-y[n-L/2N]\} \quad (22.2)$$

$$C_2[n]=g_2\{y[n]+y[n-(L-1)N]\}+g_{N+2}\{y[n-N]+y[n-(L-2)N]\}+\ldots+g_{(L/2-1)N+2}\{y[n-(L/2-1)N]+y[n-L/2N]\} \quad (22.3)$$

$$C_{N-1}[n]=g_{N-1}\{y[n]-y[n-(L-1)N]\}+g_{2N-1}\{y[n-N]-y[n-(L-2)N]\}+\ldots+g_{L/2N-1}\{y[n-(L/2-1)N]-y[n-L/2N]\}, \quad (22.N)$$

wherein:

$$g_0 = \frac{h_0 + h_{N-1}}{2}$$

$$g_1 = \frac{h_0 - h_{N-1}}{2}$$

$$g_2 = \frac{h_1 + h_{N-2}}{2}$$

$$g_3 = \frac{h_1 - h_{N-2}}{2}$$

$$\vdots$$

and in general:

$$g_i = \frac{h_j + h_k}{2}$$

for i even; and $$g_i = \frac{h_j \mp h_k}{2}$$

for i odd
wherein $$j = \left[\frac{i}{N}\right]\frac{N}{2} + \left[\frac{i}{2}\right]; \text{ and}$$

$$k = \left(3\left[\frac{i}{N}\right]+2\right)\frac{N}{2} - \left[\frac{i}{2}\right] - 1$$

[x] denoting the largest integer smaller than x.

In the general case where N and L are arbitrary even integers, the number of multipliers is reduced from NL to NL/2 and the number of additions is reduced from N(L−1) to L(N/2+1).

Figure 6:
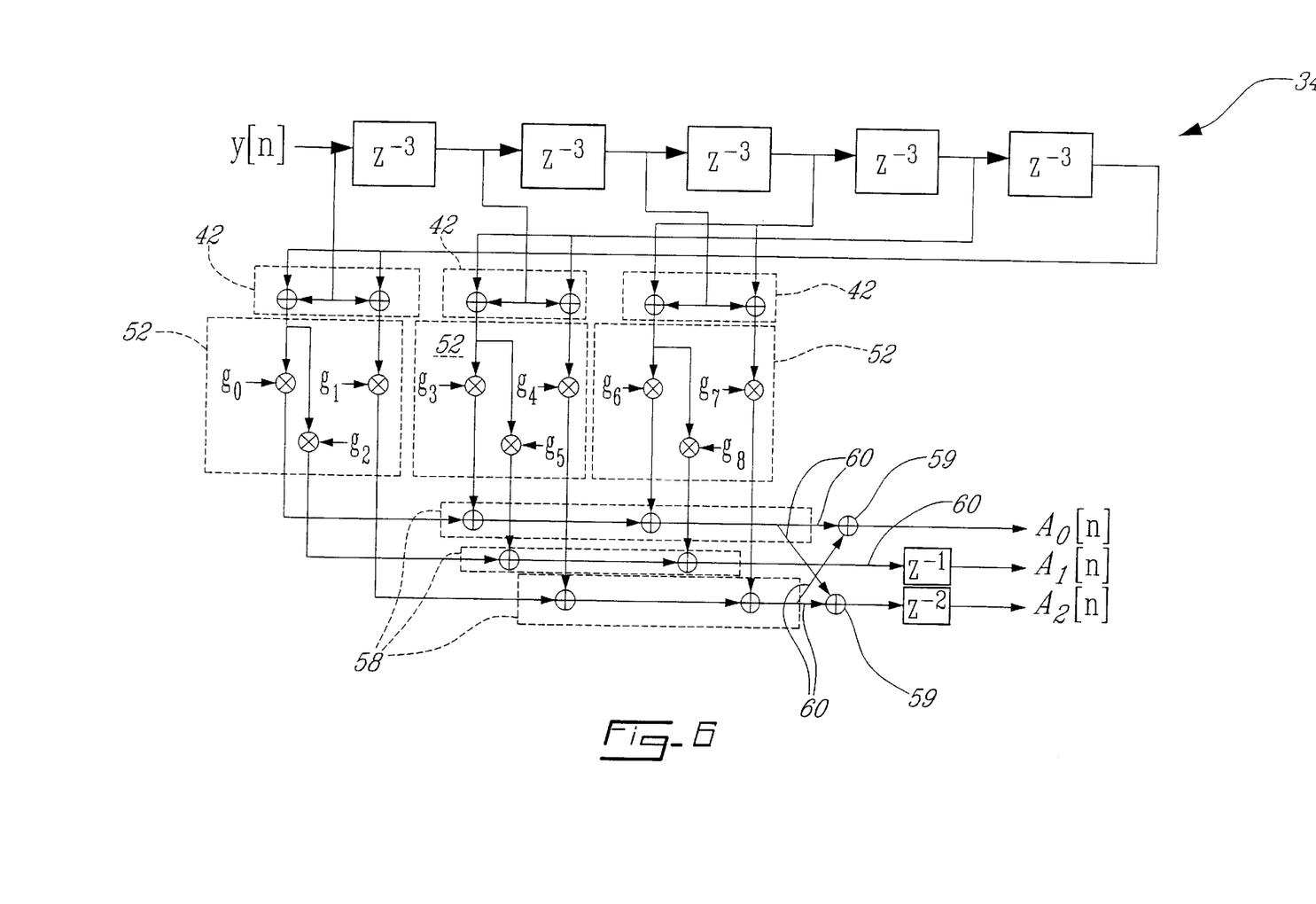
FIG. 6 is a block diagram of a second example of a digital polyphase network according to the preferred embodiment of the present invention, where the number N of channels is odd and the number L of coefficients per sub-filter is even.

Referring now to FIG. 6, a second example of a digital polyphase network according to the preferred embodiment of the present invention will be described, which network 34 is characterized by an odd number N=3 of channels and an even number L=6 of coefficients per sub-filter. Applying equation (8) above, and using coefficients $g_i$, i=0, . . . , 8 as given in Table 2, the set of N=3 transformed signals $C_k(n)$, with k=0,1,2, is given by:

$$C_0[n]=g_0\{y[n]+y[n-15]\}+g_3\{y[n-3]+y[n-12]\}+g_6\{y[n-6]+y[n-9]\} \quad (23.1)$$

$$C_1[n]=g_1\{y[n]-y[n-15]\}+g_4\{y[n-3]-y[n-12]\}+g_7\{y[n-6]-y[n-9]\} \quad (23.2)$$

$$C_2[n]=g_2\{y[n]+y[n-15]\}+g_5\{y[n-3]+y[n-12]\}+g_8\{y[n-6]+y[n-9]\} \quad (23.3)$$

TABLE 2

| | |
|---|---|
| $g_0$ | $(h_0 + h_2)/2$ |
| $g_1$ | $(h_0 - h_2)/2$ |
| $g_2$ | $h_1$ |
| $g_3$ | $(h_3 + h_5)/2$ |
| $g_4$ | $(h_3 - h_5)/2$ |
| $g_5$ | $h_4$ |
| $g_6$ | $(h_6 + h_8)/2$ |
| $g_7$ | $(h_6 - h_8)/2$ |
| $g_8$ | $h_7$ |

It can be seen from FIG. 6 that the number q of multiplier sections 52, is equal to the number of first adder sections 42, i.e. p=L/2=6/2=3, since L=6 is even, according to equations (4) and (6) above, and that a set of N=3 transformed signals $C_k(n)$, with k=0, . . . , 2, is generated through output lines 60. It can also be seen that while there are N=3 second adder sections 58, there are t=N−1=2 third adders 59 since N=3 is odd, according to equation (11) above. Therefore, $C_2(n)=A_1(n+1)$ since N=3 id odd, in accordance to equation (12) above.

Turning now to FIG. 7, a third example of a digital polyphase network according to the preferred embodiment of the present invention will be now described, which network 34 is characterized by an odd number N=3 of channels and an odd number L=5 of coefficients per sub-filter. Applying equation (8) above, and using coefficients $g_i$, i=0, . . . , 7 as given in Table 3, the set of N=3 transformed signals $C_k(n)$, with k=0,1,2, is given by:

$$C_0[n]=g_0\{y[n]+y[n-12]\}+g_3\{y[n-3]+y[n-9]\}+g_6y[n-6] \quad (24.1)$$

$$C_1[n]=g_1\{y[n]-y[n-12]\}+g_4\{y[n-3]-y[n-9]\} \quad (24.2)$$

$$C_2[n]=g_2\{y[n]+y[n-12]\}+g_5\{y[n-3]+y[n-9]\}+g_7y[n-6] \quad (24.3)$$

TABLE 3

| | |
|---|---|
| $g_0$ | $(h_0 + h_2)/2$ |
| $g_1$ | $(h_0 - h_2)/2$ |
| $g_2$ | $h_1$ |
| $g_3$ | $(h_3 + h_5)/2$ |
| $g_4$ | $(h_3 - h_5)/2$ |
| $g_5$ | $h_4$ |
| $g_6$ | $h_6$ |
| $g_7$ | $h_7$ |

It can be seen from FIG. 7 that the number q of multiplier sections 52, 52' is equal to $$p + 1 = \frac{L-1}{2} + 1 = 2 + 1 = 3,$$

since L=5 is odd, according to equations (4) and (6) above, and that a set of N=3 transformed signals $C_k(n)$, with k=0, . . . , 2, is generated through output lines 60. According to equation (7) above, the further multiplier section 52' comprises a number $$s = \frac{N+1}{2} = \frac{3+1}{2} = 2$$

of multipliers 54' receiving the shifted signal $$Y\left(n - \left(\frac{L-1}{2}\right)N\right) = Y\left(n - \left(\frac{5-1}{2}\right)3\right) = Y(n-6)$$

for combining thereof in parallel with a corresponding set of s=2 further transformed filter coefficients $g_6$ and $g_7$ derived from the coefficients of the linear phase prototype filter, as shown in Table 3. As for the example shown in FIG. 6, it can also be seen in the example of FIG. 7 that while there are N=3 second adder sections 58, there are t=N−1=2 third adders 59 since N=3 is odd, according to equation (11) above. Here again, $C_2(n) = A_1(n+1)$ since N=3 id odd, in accordance to equation (12) above.

Turning now to FIG. 8, a fourth example of a digital polyphase network according to the preferred embodiment of the present invention will be now described, which network 34 is characterized by an even number N=4 of channels and an odd number L=5 of coefficients per sub-filter. Applying again equation (8) above, and using coefficients $g_i$, i=0, . . . , 9 as given in Table 4, the set of N=4 transformed signals $C_k(n)$, with k=0,1,2,3, is given by:

$$C_0[n] = g_0\{y[n] + y[n-16]\} + g_4\{y[n-4] + y[n-12]\} + g_8 y[n-8] \quad (25.1)$$

$$C_1[n] = g_1\{y[n] - y[n-16]\} + g_5\{y[n-4] - y[n-12]\} \quad (25.2)$$

$$C_2[n] = g_2\{y[n] + y[n-16]\} + g_6\{y[n-4] + y[n-12]\} + g_9 y[n-8] \quad (25.3)$$

$$C_3[n] = g_3\{y[n] - y[n-16]\} + g_7\{y[n-4] - y[n-12]\} \quad (25.4)$$

TABLE 4

| | |
|---|---|
| $g_0$ | $(h_0 + h_3)/2$ |
| $g_1$ | $(h_0 - h_3)/2$ |
| $g_2$ | $(h_1 + h_2)/2$ |
| $g_3$ | $(h_1 - h_2)/2$ |
| $g_4$ | $(h_4 + h_7)/2$ |
| $g_5$ | $(h_4 - h_7)/2$ |
| $g_6$ | $(h_5 + h_6)/2$ |
| $g_7$ | $(h_5 - h_6)/2$ |
| $g_8$ | $h_8$ |
| $g_9$ | $h_9$ |

As for the example shown in FIG. 7, it can be seen from FIG. 8 that the number q of multiplier sections 52, 52' is also equal to p+1=3, since L=5 is odd, according to equations (4) and (6) above, and that a set of N=4 transformed signals $C_k(n)$, with k=0,1,2,3, is generated through output lines 60. According to equation (7) above, the further multiplier section 52' also comprises a number s=2 of multipliers 54' receiving the shifted signal Y(n−6) for combining thereof in parallel with a corresponding set of s=2 further transformed filter coefficients $g_8$ and $g_9$ derived from the coefficients of the linear phase prototype filter, as shown in Table 4. As for the example shown in FIG. 4, It can also be seen in FIG. 8 that while there are N=4 second adder sections 58, there are t=N=4 third adders 59 since N=4 is even, according to equation (11) above.

I claim:

1. A polyphase digital filter network based on a linear phase prototype filter for use in a group demultiplexer for generating N output data signals associated with N channels from a corresponding Frequency Division Multiplexed input signal Y(n), said linear phase prototype filter comprising N sub-filters being characterized by L coefficients forming NL coefficients for said prototype filter, said polyphase digital filter network comprising:

L−1 $Z^{-N}$ shift registers in series receiving said multiplexed input signal Y(n) to produce L−1 corresponding shifted signals Y(n−rN), with r=1, . . . , L−1;

a set of p first adder sections each receiving a distinct pair of signals from said multiplexed input signal Y(n) and said shifted signals Y(n−rN);

a set of q multiplier sections including p first multiplier sections each being coupled to a respective output of a corresponding one of said first adder sections for combining each said output with a corresponding set of N transformed filter coefficients $g_i$ derived from said coefficients of said linear phase prototype filter;

said set of q multiplier sections including a further multiplier section receiving shifted signal $$Y\left(n - \left(\frac{L-1}{2}\right)N\right)$$

where L is odd for combining thereof in parallel with a corresponding set of s further transformed filter coefficients $g_i$ derived from the coefficients of said linear phase prototype filter;

a set of N second adder sections each being coupled to distinct outputs of said multiplier sections for producing a corresponding set of N transformed signals $C_k(n)$, with k=0, . . . , N−1; and a set of t third adders each receiving a distinct pair of signals $\{C_T(n), C_{T'}(n)\}$ from said transformed signals $C_k(n)$ for producing a first filtered signal $A_0(n)$ and a set of N−1 filtered signals $A_k(n+k)$, with k=1, . . . , N−1.

2. A polyphase digital filter network according to claim 1, wherein:

$$p = \begin{cases} L/2 & \text{where } L \text{ is even} \\ \dfrac{L-1}{2} & \text{where } L \text{ is odd} \end{cases};$$

said distinct pair of signals being defined by:

$$\{Y(n-mN), Y(n-(L-(1+m)N))\}$$

with:

$$m = \begin{cases} 0, \ldots, \dfrac{L-2}{2} & \text{where } L \text{ is even} \\ 0, \ldots, \dfrac{L-3}{2} & \text{where } L \text{ is odd} \end{cases};$$

and wherein:

$$q = \begin{cases} p & \text{where } L \text{ is even} \\ p+1 & \text{where } L \text{ is odd} \end{cases};$$

$$s = \begin{cases} N/2 & \text{where } N \text{ is even} \\ \dfrac{N+1}{2} & \text{where } N \text{ is odd} \end{cases};$$

$$\{C_T(n), C_{T'}(n)\} = \{C_{2u}(n), C_{2u+1}(n)\}$$

$$\begin{cases} \text{for } u = 0, \ldots, N/2 - 1 & \text{where } N \text{ is even} \\ \text{for } u = 0, \ldots, \dfrac{N-3}{2} & \text{where } N \text{ is odd} \end{cases};$$

-continued $$\{C_T(n), C_{T'}(n)\} = \{C_{2(n-u-1)}(n),$$

$$-C_{2(n-u)-1}(n)\} \begin{cases} \text{for } u = N/2, \ldots, N-1 & \text{where } N \text{ is even} \\ \text{for } u = \frac{N+1}{2}, \ldots, N-1 & \text{where } N \text{ is odd} \end{cases};$$

$$t = \begin{cases} N & \text{where } N \text{ is even} \\ N-1 & \text{where } N \text{ is odd} \end{cases}; \text{ and}$$

$$A_{u=\frac{N-1}{2}}\left(n + \frac{N-1}{2}\right) =$$

$$C_{N-1}(n) \text{ where } N \text{ is odd}.$$

3. A polyphase digital filter network according to claim 1 or 2, further comprising:
N−1 $Z^{-k}$ shift registers receiving said filtered signals $A_k(n+k)$ to produce N−1 corresponding filtered signals $A_k(n)$, with k=1, ..., N−1.

4. A polyphase digital filter network according to claim 1 or 2, wherein each said first adder section comprises:
a first adder having a pair of positive inputs receiving said distinct pair of signals and an output; and
a second adder having positive and inverting inputs receiving said distinct pair of signals respectively and an output;
said first and second adder outputs forming said respective output of said corresponding first adder section.

5. A polyphase digital filter network according to claim 4, wherein each said first multiplier section comprises N multipliers each having a respective output $M_i$ and being coupled in parallel to said corresponding first adder output for combining thereof with N corresponding said transformed filter coefficients $g_i$ and s multipliers each having an output $M_i$ and being coupled in parallel to said corresponding second adder section output for combining thereof with s corresponding said further transformed filter coefficients $g_i$.

6. A polyphase digital filter network according to claim 5, wherein said set of N transformed signals $C_k(n)$, with k=0, ..., N−1, are produced by said set of N second adder sections as follows:

$$C_k(n) = \sum_{i=k+Nl} M_i; \text{ with} \begin{cases} l=0, \ldots, L/2 & \text{where } L \text{ is even} \\ l=0, \ldots, \frac{L-1}{2} & \text{where } L \text{ is odd and } k \text{ is even} \\ l=0, \ldots, \frac{L-3}{2} & \text{where } L \text{ is odd and } k \text{ is odd} \end{cases}.$$

7. A polyphase/DFT digital group demultiplexer for generating N output data signals associated with N channels from a corresponding Frequency Division Multiplexed input signal Y(n), comprising:
a polyphase digital filter network based on a linear phase prototype filter formed by N sub-filters being characterized by L coefficients forming NL coefficients for said prototype filter, said polyphase digital filter network comprising:
L−1 $Z^{-N}$ shift registers in series receiving said multiplexed input signal Y(n) to produce L−1 corresponding shifted signals Y(n−rN), with r=1, ..., L−1;
a set of p first adder sections each receiving a distinct pair of signals from said multiplexed input signal Y(n) and said shifted signals Y(n−rN);
a set of q multiplier sections including p first multiplier sections each being coupled to a respective output of a corresponding one of said first adder sections for combining each said output with a corresponding set of N transformed filter coefficients $g_i$ derived from said coefficients of said linear phase prototype filter, wherein:
said set of q multiplier sections including a further multiplier section receiving shifted signal $$Y\left(n - \left(\frac{L-1}{2}\right)N\right)$$

where L is odd for combining thereof with a corresponding set of s further transformed filter coefficients $g_i$ derived from the coefficients of said linear phase prototype filter;
a set of N second adder sections each being coupled to selected outputs of said multiplier sections for producing a corresponding set of N transformed signals $C_k$, with k=0, ..., N−1;
a set of t third adders each receiving a distinct pair of signals $\{C_T(n),C_{T'}(n)\}$ from said transformed signals $C_k(n)$ for producing a first filtered signal $A_0(n)$ and a set of N−1 filtered signals $A_k(n+k)$, with k=1, ..., N−1;
a set of N−1 shift registers $Z^{-k}$ receiving said filtered signals $A_k(n+k)$ to produce N−1 corresponding filtered signals $A_k(n)$, with k=1, ..., N−1;
a set of N phase offset multipliers receiving said filtered signals $A_0(n)$ and $A_k(n)$ forming a set of filtered signals $A_k(n)$, with k=0, ..., N−1, for combining thereof with a corresponding set of N phase offset parameter $w_k$, with k=0, ..., N−1, to produce a corresponding set of phase offset filtered signals $A^*_k(n)$;
Discrete Fourier Transform processor means for generating a set of N processed output signals $B_k(n)$ from said corresponding set of phase offset filtered signals $A^*_k(n)$, with k=0, ..., N−1; and
a set of N output alternate inverting multipliers each receiving a corresponding one of said set of processed output signals $B_k(n)$ to generate said N output data signals associated with said N channels.

8. A polyphase/DFT digital group demultiplexer according to claim 7 wherein:

$$p = \begin{cases} L/2 & \text{where } L \text{ is even} \\ \frac{L-1}{2} & \text{where } L \text{ is odd} \end{cases};$$

said distinct pair of signals being defined by:

$$\{Y(n-mN),Y(n-(L-(1+m)N))\}$$

with:

$$m = \begin{cases} 0, \ldots, \frac{L-2}{2} & \text{where } L \text{ is even} \\ 0, \ldots, \frac{L-3}{2} & \text{where } L \text{ is odd} \end{cases};$$

and wherein:

$$q = \begin{cases} p & \text{where } L \text{ is even} \\ p+1 & \text{where } L \text{ is odd} \end{cases};$$

-continued $$s = \begin{cases} N/2 & \text{where } N \text{ is even} \\ \dfrac{N+1}{2} & \text{where } N \text{ is odd} \end{cases};$$

$$\{C_T(n), C_{T'}(n)\} = \{C_{2u}(n), C_{2u+1}(n)\}\begin{cases} \text{for } u = 0, \ldots, N/2 - 1 & \text{where } N \text{ is even} \\ \text{for } u = 0, \ldots, \dfrac{N-3}{2} & \text{where } N \text{ is odd} \end{cases};$$

$$\{C_T(n), C_{T'}(n)\} = \{C_{2(n-u-1)}(n),$$
$$-C_{2(n-u)-1}(n)\}\begin{cases} \text{for } u = N/2, \ldots, N-1 & \text{where } N \text{ is even} \\ \text{for } u = \dfrac{N+1}{2}, \ldots, N-1 & \text{where } N \text{ is odd} \end{cases};$$

$$t = \begin{cases} N & \text{where } N \text{ is even} \\ N-1 & \text{where } N \text{ is odd} \end{cases}; \text{ and}$$

$$A_{u=\frac{N-1}{2}}\left(n + \frac{N-1}{2}\right) = C_{N-1}(n) \text{ where } N \text{ is odd}.$$

9. A polyphase/DFT digital group demultiplexer according to claim 7 or 8, wherein each said first adder section comprises:

a first adder having a pair of positive inputs receiving said distinct pair of signals and an output; and a second adder having positive and inverting inputs receiving said distinct pair of signals respectively and an output;

said first and second adder outputs forming said respective output of said corresponding first adder section.

10. A polyphase/DFT digital group demultiplexer according to claim 9, wherein each said first multiplier section comprises N multipliers $M_i$ being coupled in parallel to said corresponding first adder output for combining thereof with N corresponding said transformed filter coefficients $g_i$ and s multipliers $M_i$ being coupled in parallel to said corresponding second adder section output for combining thereof with s corresponding said further transformed filter coefficients $g_i$.

11. A polyphase/DFT digital group demultiplexer according to claim 10, wherein said set of N transformed signals $C_k(n)$, with k=0, ..., N−1, are produced by said set of N second adder sections as follows:

$$C_k(n) = \sum_{i=k+Nl} M_i; \text{with} \begin{cases} l = 0, \ldots, L/2 & \text{where } L \text{ is even} \\ l = 0, \ldots, \dfrac{L-1}{2} & \text{where } L \text{ is odd and } k \text{ is even} \\ l = 0, \ldots, \dfrac{L-3}{2} & \text{where } L \text{ is odd and } k \text{ is odd} \end{cases}.$$

12. A method of demultiplexing a Frequency Division Multiplexed input signal Y(n) for generating N output data signals associated with N channels, said method comprising the steps of:

generating L−1 shifted signals Y(n−rN), with r=1, (l−1)N, from said multiplexed input signal Y(n);

coupling p pairs of distinct signals from said multiplexed input signal Y(n) and said shifted signals Y(n−rN) to produce p corresponding pairs of coupled output signals;

combining each said pair of output signals with a corresponding set of N transformed filter coefficients derived from coefficients of a linear phase prototype filter;

combining shifted signal $$Y\left(n - \left(\frac{L-1}{2}\right)N\right)$$

with a corresponding set of s further transformed filter coefficients derived from the coefficients of said linear phase prototype filter, whenever L is odd;

coupling the results of said combining steps to produce N transformed signals $C_k$, with k=0, ..., N−1;

coupling distinct pair of signals $\{C_T(n), C_{T'}(n)\}$ from said transformed signals $C_k(n)$ for producing a first filtered signal $A_0(n)$ and a set of N−1 filtered signals;

shifting said filtered signals $A_k(n+k)$ to produce N−1 corresponding filtered signals $A_k(n)$, with k=1, ..., N−1;

phase offsetting said filtered signals $A_0(n)$ and $A_k(n)$ forming a set of filtered signals $A_k(n)$, to produce a corresponding set of phase offset filtered signals $A^*_k(n)$;

applying a Discrete Fourier Transform on said phase offset filtered signals $A^*_k(n)$ to generate a set of N output signals $B_k(n)$, with k=0, ..., N−1; and alternately inverting said output signals $B_k(n)$ to generate said N output data signals associated with said N channels.

13. A method of demultiplexing a Frequency Division Multiplexed input signal according to claim 12, wherein:

$$p = \begin{cases} L/2 & \text{where } L \text{ is even} \\ \dfrac{L-1}{2} & \text{where } L \text{ is odd} \end{cases};$$

said distinct pair of signals being defined by:

$$\{Y(n-mN), Y(n-(L-(1+m)N))\}$$

with:

$$m = \begin{cases} 0, \ldots, \dfrac{L-2}{2} & \text{where } L \text{ is even} \\ 0, \ldots, \dfrac{L-3}{2} & \text{where } L \text{ is odd} \end{cases};$$

and wherein:

$$q = \begin{cases} p & \text{where } L \text{ is even} \\ p+1 & \text{where } L \text{ is odd} \end{cases};$$

$$s = \begin{cases} N/2 & \text{where } N \text{ is even} \\ \dfrac{N+1}{2} & \text{where } N \text{ is odd} \end{cases};$$

$$\{C_T(n), C_{T'}(n)\} =$$
$$\{C_{2u}(n), C_{2u+1}(n)\}\begin{cases} \text{for } u = 0, \ldots, N/2^{-1} & \text{where } N \text{ is even} \\ \text{for } u = 0, \ldots, \dfrac{N-3}{2} & \text{where } N \text{ is odd} \end{cases};$$

$$\{C_T(n), C_{T'}(n)\} = \{C_{2(n-u-1)}(n),$$
$$-C_{2(n-u)-1}(n)\}\begin{cases} \text{for } u = 0, \ldots, N/2^{-1} & \text{where } N \text{ is even} \\ \text{for } u = 0, \ldots, \dfrac{N-3}{2} & \text{where } N \text{ is odd} \end{cases};$$

$$t = \begin{cases} N & \text{where } N \text{ is even} \\ N-1 & \text{where } N \text{ is odd} \end{cases}; \text{ and}$$

$$A_{u=\frac{N-1}{2}}\left(n + \frac{N-1}{2}\right) = C_{N-1}(n) \text{ where } N \text{ is odd}.$$

* * * * *